(12) United States Patent
Dewan et al.

(10) Patent No.: US 11,886,316 B2
(45) Date of Patent: *Jan. 30, 2024

(54) PLATFORM MEASUREMENT COLLECTION MECHANISM

(71) Applicant: Intel Corporation, Santa Clara, CA (US)

(72) Inventors: Prashant Dewan, Portland, OR (US); Uttam Sengupta, Portland, OR (US); Aditya Katragada, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/733,347

(22) Filed: Apr. 29, 2022

(65) Prior Publication Data

US 2022/0253366 A1 Aug. 11, 2022

Related U.S. Application Data

(63) Continuation of application No. 16/832,163, filed on Mar. 27, 2020, now Pat. No. 11,416,370.

(51) Int. Cl.
*G06F 11/34* (2006.01)
*H04L 9/32* (2006.01)
*H04L 67/125* (2022.01)

(52) U.S. Cl.
CPC ...... *G06F 11/3414* (2013.01); *G06F 11/3495* (2013.01); *H04L 9/3263* (2013.01); *H04L 67/125* (2013.01)

(58) Field of Classification Search
CPC ............ G06F 11/3404; G06F 11/3414; G06F 11/3495; H04L 67/125; H04L 9/0643; H04L 9/0894; H04L 9/3263
USPC ......................................................... 702/186
See application file for complete search history.

(56) References Cited

U.S. PATENT DOCUMENTS

| | | | |
|---|---|---|---|
| 9,471,367 B1 | 10/2016 | Hu et al. | |
| 9,658,978 B2 * | 5/2017 | Lakshmanamurthy | G06F 13/364 |
| 11,416,370 B2 * | 8/2022 | Dewan | H04L 67/125 |
| 2013/0138858 A1 | 5/2013 | Adler et al. | |
| 2019/0033368 A1 * | 1/2019 | Pappu | G01R 31/318513 |
| 2020/0026505 A1 | 1/2020 | Olderdissen | |
| 2020/0074086 A1 | 3/2020 | Bulygin et al. | |
| 2020/0226047 A1 | 7/2020 | Dewan et al. | |

FOREIGN PATENT DOCUMENTS

CN 113448914 A 9/2021

* cited by examiner

*Primary Examiner* — John H Le
(74) *Attorney, Agent, or Firm* — Jaffery Watson Mendonsa & Hamilton LLP (57) ABSTRACT

An apparatus to collect firmware measurement data at a computing system is disclosed. The apparatus includes a plurality of agents, each including a non-volatile memory storing firmware executed to perform a function associated with the agent, verification logic to generate measurement data by verifying the integrity of the firmware and a register to store the measurement data, and a processor to execute an instruction to collect firmware measurement data from each of the plurality of agents.

20 Claims, 9 Drawing Sheets

PLATFORM MEASUREMENT COLLECTION MECHANISM

CROSS REFERENCE TO RELATED APPLICATIONS

The present patent application is a continuation application claiming priority from U.S. Application Ser. No. 16/832,163, filed Mar. 27, 2020, the contents of which are incorporated herein in their entirety by reference.

BACKGROUND OF THE DESCRIPTION

A system on chip (SOC) is an integrated circuit that integrates all components of a computer or other electronic system. These components include a central processing unit (CPU), memory, input/output (IO) ports and secondary storage, which are all included on a single substrate or microchip. Additionally, SOCs enable the integration of third party components via a standardized on-die interconnect protocol. However, the addition of such components may lead to security vulnerabilities.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope, for the disclosure may admit to other equally effective embodiments.

DETAILED DESCRIPTION

In the following description, numerous specific details are set forth to provide a more thorough understanding. However, it will be apparent to one of skill in the art that the embodiments may be practiced without one or more of these specific details. In other instances, well-known features have not been described in order to avoid obscuring the embodiments.

In embodiments, a mechanism is provided to collect firmware measurement data from firmware included in each a plurality of agents in a computing system platform. In further embodiments, an instruction is executed at a processor to collect the firmware measurement data from the agents. In still further embodiments, the collected measurement data is written to a manifest file and signed.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Figure 1:
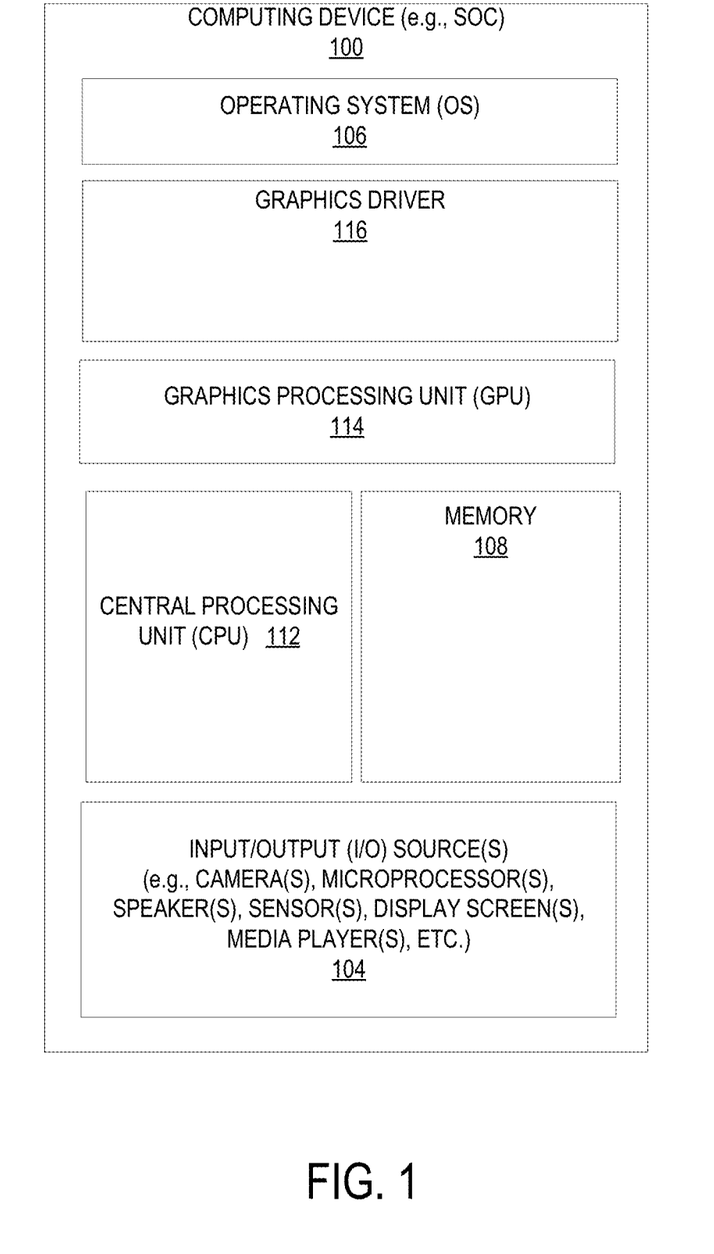
FIG. 1 illustrates one embodiment of a computing device.

FIG. 1 illustrates one embodiment of a computing device 100. According to one embodiment, computing device 100 comprises a computer platform hosting an integrated circuit ("IC"), such as a system on a chip ("SoC" or "SOC"), integrating various hardware and/or software components of computing device 100 on a single chip. As illustrated, in one embodiment, computing device 100 may include any number and type of hardware and/or software components, such as (without limitation) graphics processing unit 114 ("GPU" or simply "graphics processor"), graphics driver 116 (also referred to as "GPU driver", "graphics driver logic", "driver logic", user-mode driver (UMD), UMD, user-mode driver framework (UMDF), UMDF, or simply "driver"), central processing unit 112 ("CPU" or simply "application processor"), memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

Figure 2A:
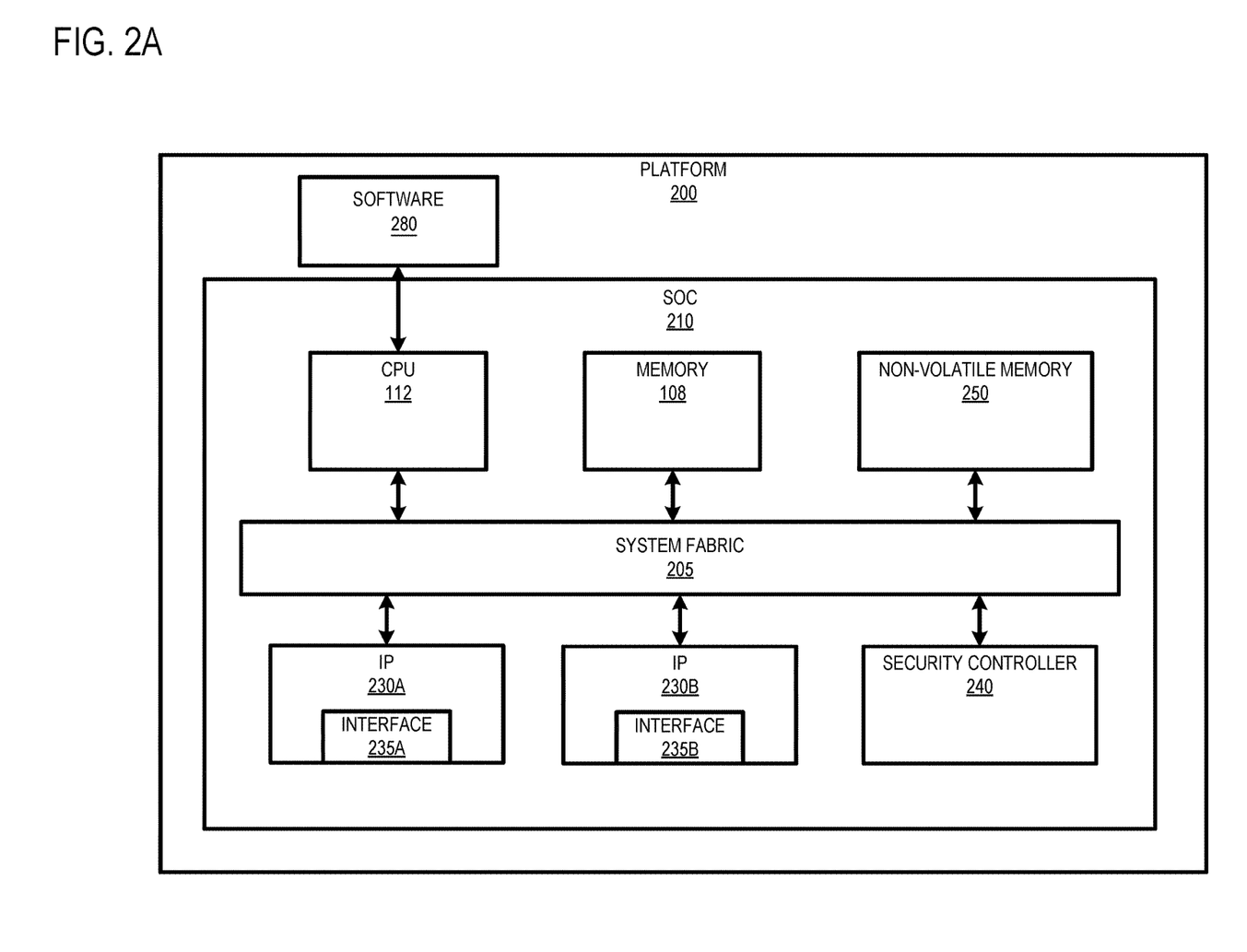
FIGS. 2A-2C illustrate embodiments of a platform.
Figure 2B:
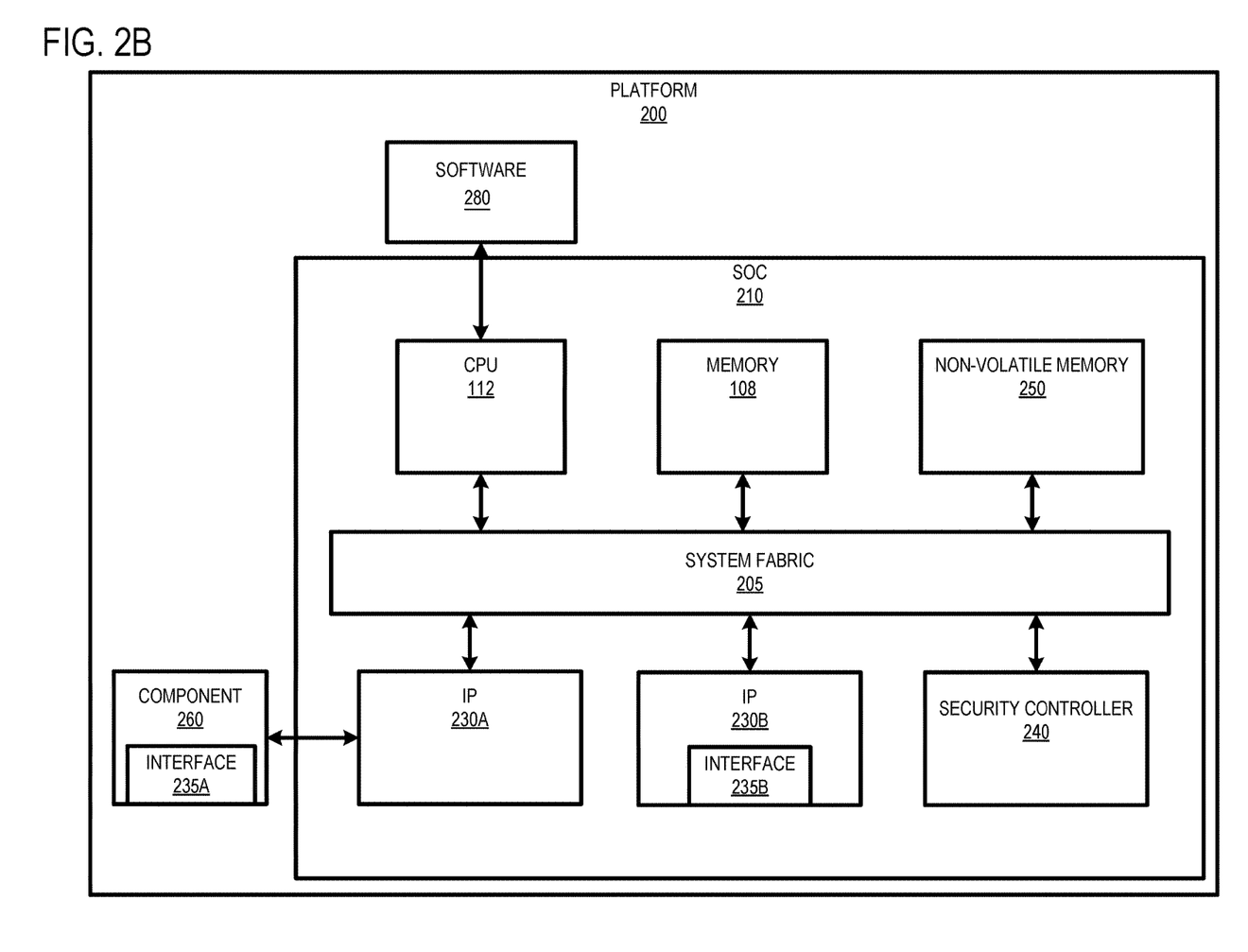
Figure 2C:
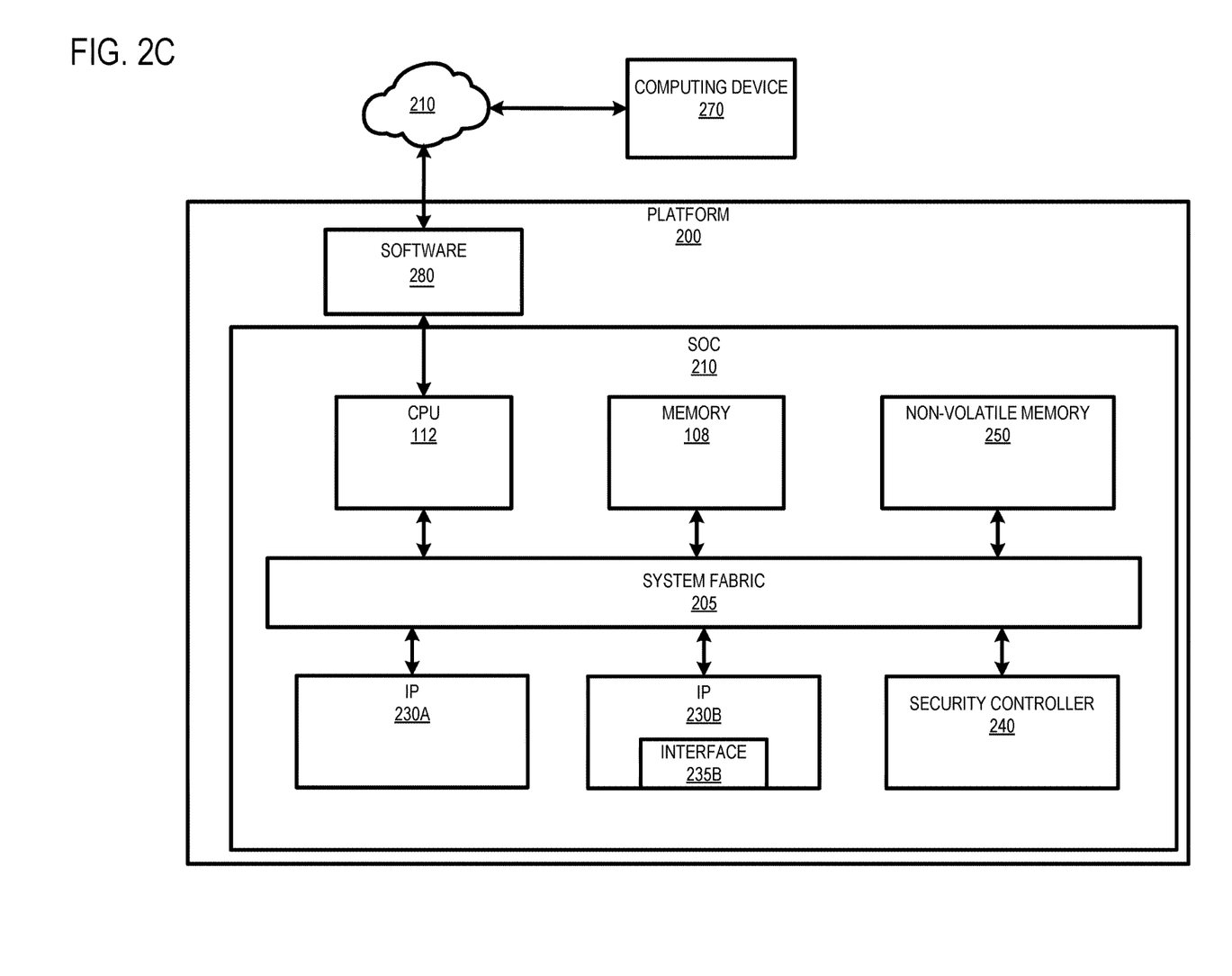

FIGS. 2A-2C illustrate embodiments of a platform 200 including a SOC 210 similar to computing device 100 discussed above. As shown in FIG. 2A, platform 200 includes SOC 210 communicatively coupled to one or more software components 280 via CPU 112. Additionally, SOC 210 includes other computing device components (e.g., memory 108) coupled via a system fabric 205. In one embodiment, system fabric 205 comprises an integrated on-chip system fabric (IOSF) to provide a standardized on-die interconnect protocol for coupling interconnect protocol (IP) agents 230 (e.g., IP blocks 230A and 230B) within SOC 210. In such an embodiment, the interconnect protocol provides a standardized interface to enable third parties to design logic such as IP agents 230 to be incorporated in SOC 210.

According to embodiment, IP agents 230 may include general purpose processors (e.g., in-order or out-of-order cores), fixed function units, graphics processors, I/O controllers, display controllers, etc. In such an embodiment, each IP agent 230 includes a hardware interface 235 to provide standardization to enable the IP agent 230 to communicate with SOC 210 components. For example, in an embodiment in which IPA agent 230 is a third party visual processing unit (VPU), interface 235 provides a standardization to enable the VPU to access memory 108 via fabric 205.

SOC 210 also includes a security controller 240 that operates as a security engine to perform various security operations (e.g., security processing, cryptographic functions, etc.) for SOC 210. In one embodiment, security controller 240 comprises an IPA agent 230 that is implemented to perform the security operations. Further, SOC 210 includes a non-volatile memory 250. Non-volatile memory 250 may be implemented as a Peripheral Component Interconnect Express (PCIe) storage drive, such as a solid state drives (SSD) or Non-Volatile Memory Express (NVMe) drives.

FIG. 2B illustrates another embodiment of platform 200 including a component 270 coupled to SOC 210 via IP 230A. In one embodiment, IP 230A operates as a bridge, such as a PCIe root port, that connects component 260 to SOC 210. In this embodiment, component 260 may be implemented as a PCIe device (e.g., switch or endpoint) that includes a hardware interface 235 to enable component 260 to communicate with SOC 210 components. FIG. 2C illustrates yet another embodiment of platform 200 including a computing device 270 coupled to platform 200 via a cloud network 210. In this embodiment, computing device 270 comprises a cloud agent that is provided access to SOC 210 via software 280.

IP agents, such as IP agents 230, need firmware for execution. Such firmware contributes to the security of SOC 210, and must be securely reported to other components on platform, software and cloud agents. Moreover, IP agent, SOC and platform measurement and reporting to identify and enable an accurate set of functionalities on a system is gaining traction. Measurement data root of trust measurements (RTM) used to verify a firmware component operating on the agent.

Gathering measurement data is a complex task since the platform includes various IP agents that have been developed, and more importantly secured, by different IP providers. In current platforms this process is performed by statically re-writing code based on the particular platform architecture. Thus, there is no standard method or protocol to collect measurement data from IP agents within a platform. For example, there is no single entity in a SOC that has access to firmware measurements of the firmware for all IP agents.

According to one embodiment, a mechanism to enable SOC 210 to provide IP agent firmware measurements is disclosed. In such an embodiment, CPU 112 executes an instruction (e.g., GET_FIRMWARE_MEASUREMENTS) that enables software 250 to collect the measurements. In a further embodiment, each interface 235 within an IP agent 230 (or other component) provides internal firmware measurement data. The collected measurements are subsequently written to a manifest file provided by software 250 and signed. As defined herein, measurement data is data acquired from performing a hash on contents of firmware within an IP agent 230.

In yet a further embodiment, software 280 may provide the manifest to a cloud agent operating at computing device 260. As defined herein, a manifest file (or manifest) is a file containing metadata for a group of accompanying files that are part of a set or coherent unit. A manifest may be signed by generating a cryptographic signature (e.g., cryptographic hash or checksum) to validate the manifest for authenticity and integrity.

Figure 3:
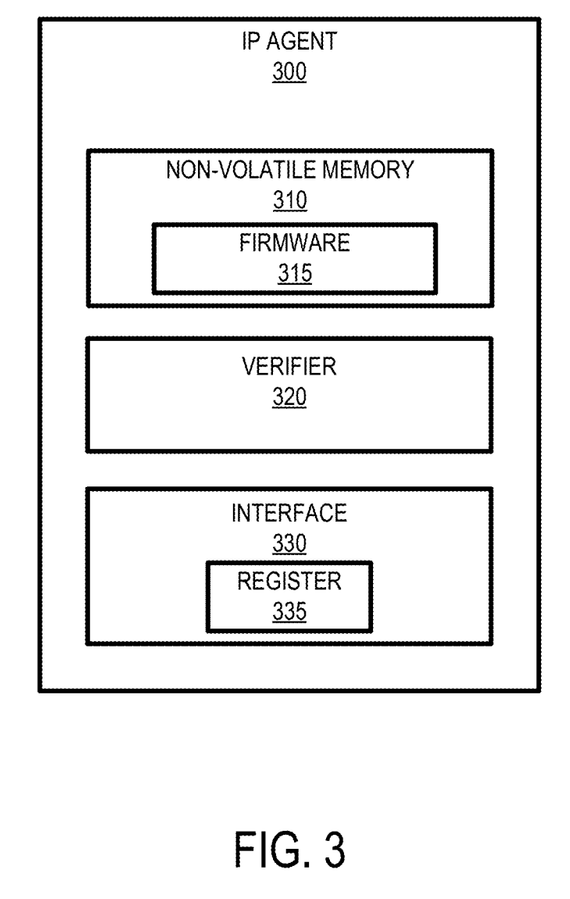
FIG. 3 illustrates one embodiment of interconnect protocol agent.

FIG. 3 illustrates one embodiment of an IP agent 300. According to one embodiment, agent 300 includes a non-volatile memory 310 including firmware 315 that is executed to perform the particular function associated with the agent 300. For instance, firmware 315 is executed at a VPU to perform video processing functions. In one embodiment, firmware 315 for each agent is securely reported to other platform 200 components, software 250 and/or cloud components.

Agent 300 also includes a verifier 320 implemented to verify the integrity of firmware 315. In such an embodiment, verifier 320 generates measurement data by verifying the integrity of firmware 315. In a further embodiment, the integrity is verified via a hash algorithm (e.g., MD5 message-digest algorithm, Secure Hash Algorithm 1 (SHA-1)) performed on the firmware data (or image). Although shown as being implemented within agent 300, other embodiments may feature verifier 320 being implemented at an external component (e.g., Basic Input/Output System (BIOS) firmware, virtual machine manager, software driver, etc.)

Interface 330 is also included within agent 300. According to one embodiment interface 330 includes register 335 to store the firmware measurement data. In a further embodiment, register 335 is located at a fixed address offset from interface 330 and interface 330 is located at a standard address for every agent 300. In yet a further embodiment, register 335 is accessible via fabric 205. Table 1 shows one embodiment of register 335

TABLE 1

| Bits | Access Type | Default | Description |
|---|---|---|---|
| 512:0 | RO | 11'h0 | HASH of the image being verified and loaded into the agent |

Figure 4A:
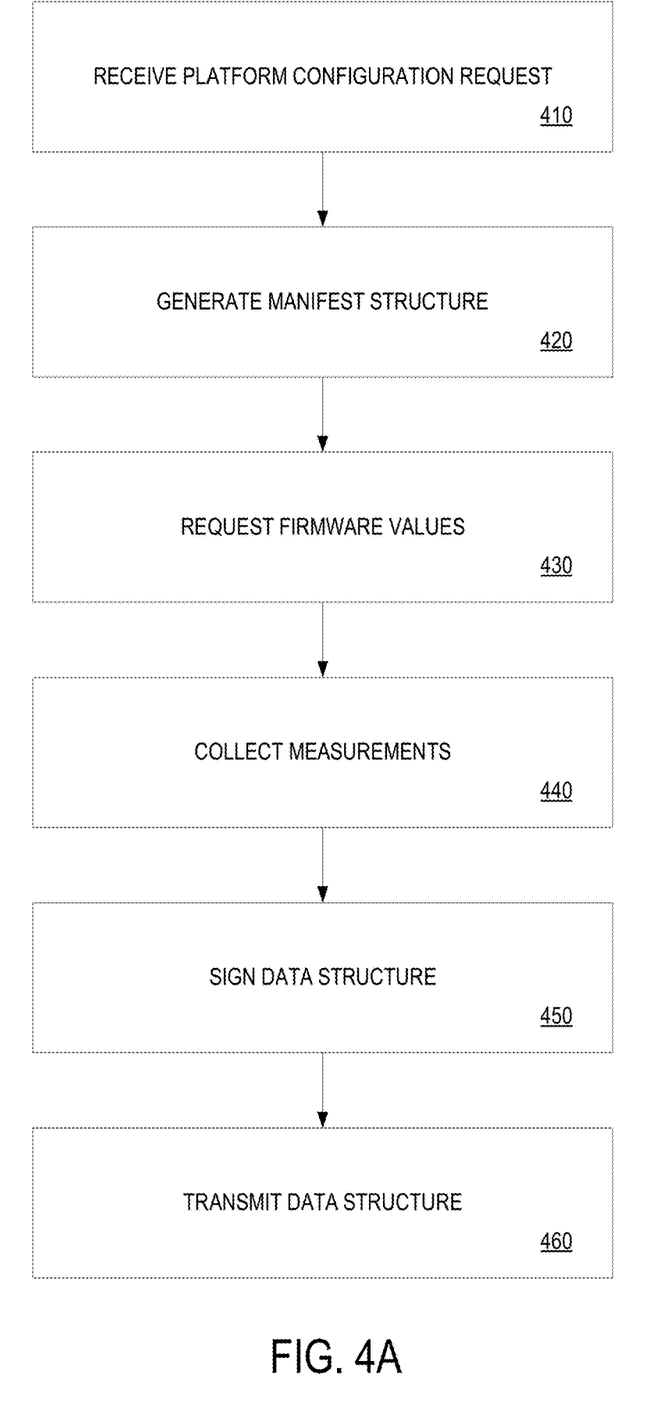
FIG. 4A is a flow diagram illustrating one embodiment of a process for providing platform firmware measurements.
Figure 4B:
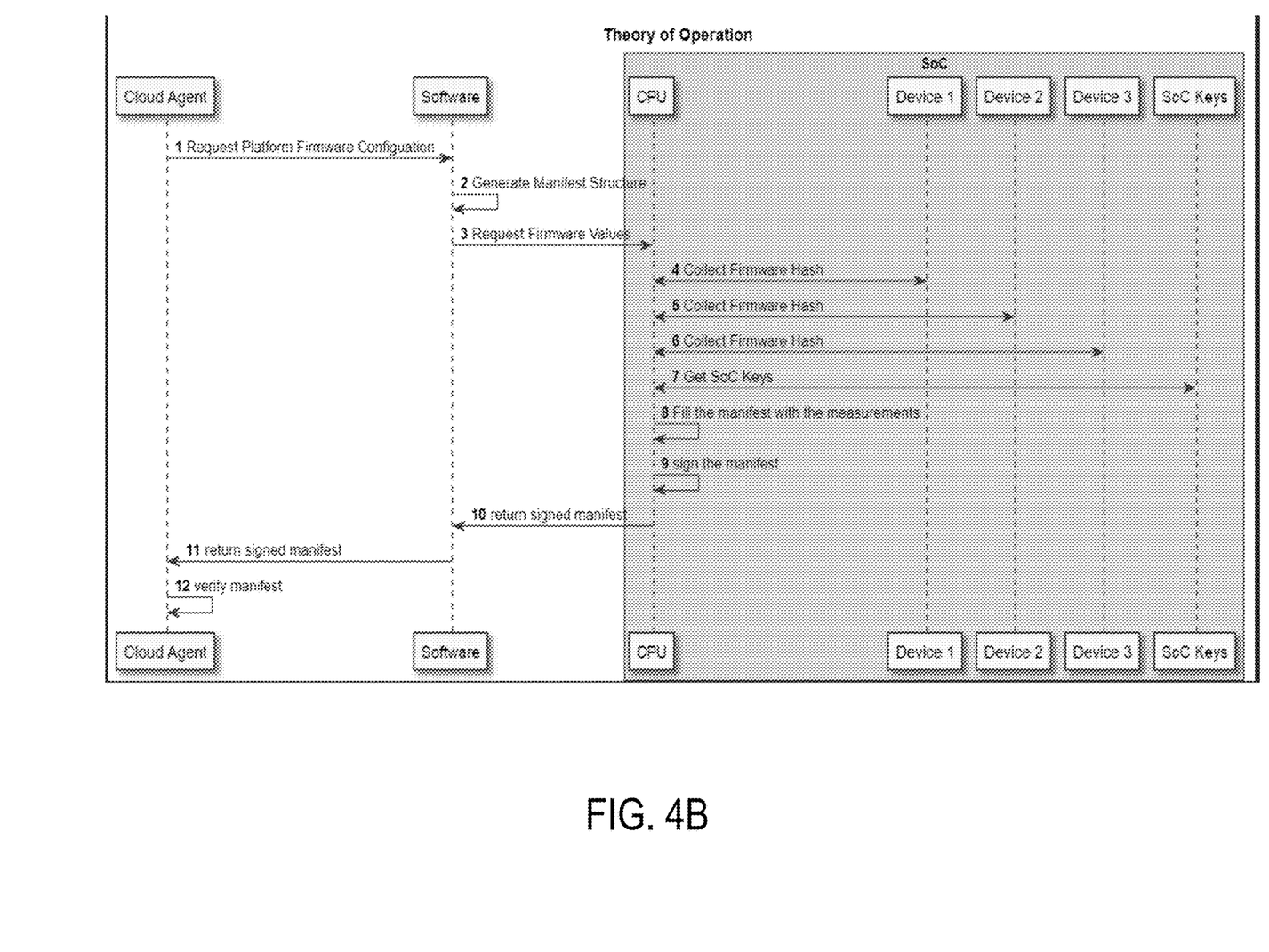
FIG. 4B is a sequence diagram illustrating another embodiment of a process for providing platform firmware measurements.
Figure 5:
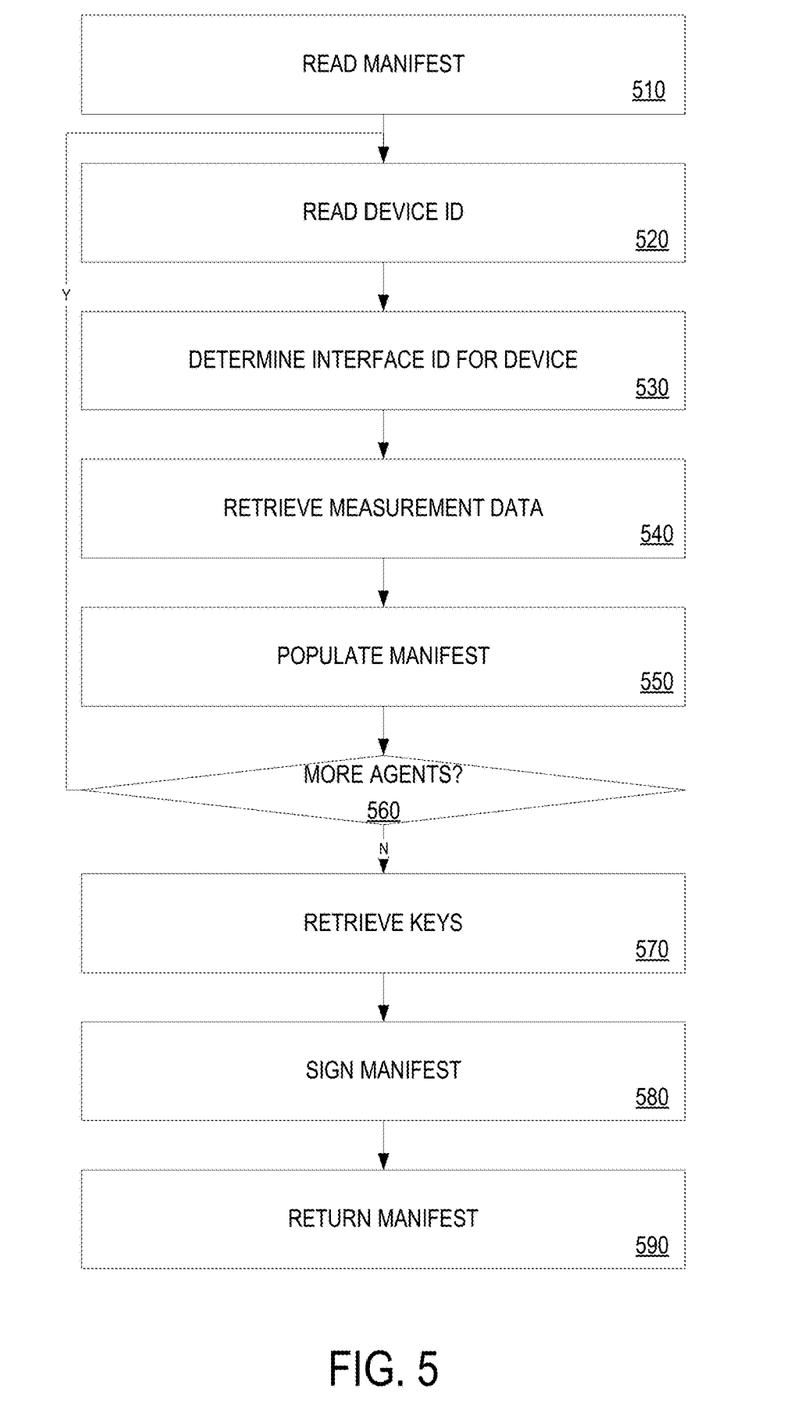
FIG. 5 is a flow diagram illustrating one embodiment of a process performed in response to execution of an instruction at a processor.

FIG. 4A is a flow diagram illustrating one embodiment of a process for providing platform firmware measurements. At processing block 410, a platform configuration request is received. In one embodiment, the request is received at a software application (e.g., software 250) from a cloud agent. At processing block 420, a manifest data structure is generated (e.g., via software). At processing block 430, software requests to receive firmware measurements from the platform. In one embodiment, the request is made by calling a CPU instruction with the manifest data structure. At processing block 440, the CPU executes the instruction by accessing the register at each agent in the platform (e.g., via fabric 205) to collect the measurement data. At processing block 450, the CPU signs the manifest data structure including all of the measurement data. At processing block 460, the signed manifest is transmitted (e.g., by software) for verification (e.g., via a cloud agent). FIG. 4B is a sequence diagram illustrating another embodiment of a process for providing platform firmware measurements FIG. 5 is a flow diagram illustrating one embodiment of a process for performing a CPU instruction (e.g., GET_FIRMWARE_MEASUREMENTS) to collect measurement data. At processing block 510, the manifest data structure is read. Subsequently, determines a number of IP agents within the platform. At processing block 520, a device identifier (ID) (e.g., for a first agent) is read. At processing block 530, an interface ID associated with the device ID is determined. At processing block 540, measurement data is retrieved from the agent associated with the device ID. At processing block 550, the manifest data structure is populated with the measurement data. At decision block 560, a determination is made as to whether there are additional agents from which to receive measurement data. If so, control is returned to processing block 520, where the device ID of the next agent is read. Otherwise, cryptographic keys to sign the manifest are retrieved, processing block 570. At processing block 580, the manifest is signed. At processing block 590, the manifest including the measurement data is returned.

In a further embodiment, the manifest may be used to access firmware 315 at one or more IP agents 300. In such an embodiment, a requestor (e.g., software 280, cloud agent, etc.) may request access to the firmware 315. In response, the CPU verifies the integrity of the requestor prior to retrieving the requested firmware 315 and providing it to the requestor.

The above-described mechanism prevents re-writing of operating system and BIOS software that is used to collect attestation evidence for the platform and/or SOC. Additionally, the mechanism prevents security bugs and improves security assurance due to more efficient validation of standard code when compared to non-standard implementations. Moreover, the mechanism may be used with any operating system or security ecosystem while being fully IP agent and SOC agnostic.

Figure 6:
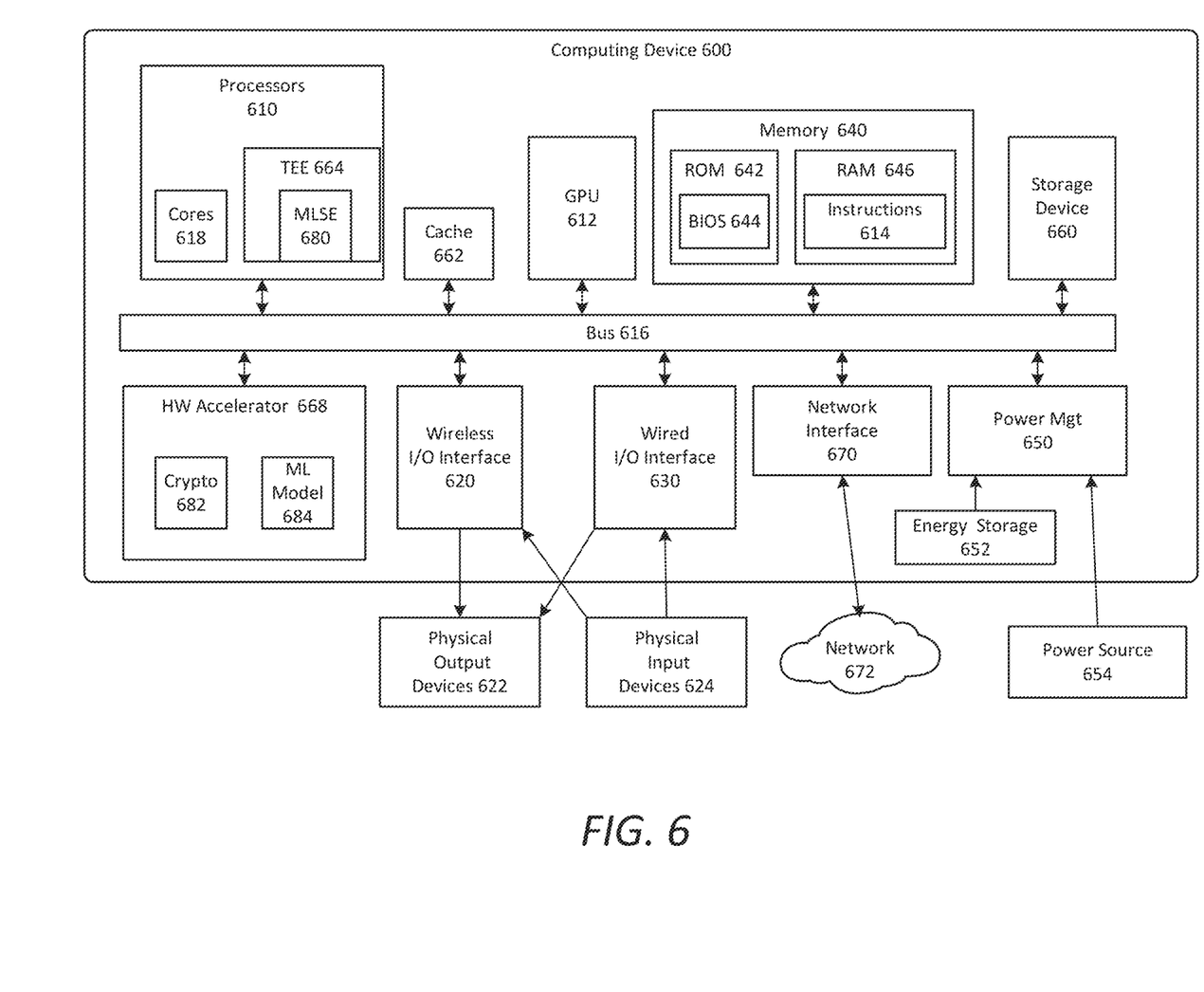
FIG. 6 illustrates one embodiment of a schematic diagram of an illustrative electronic computing device.

FIG. 6 is a schematic diagram of an illustrative electronic computing device to enable enhanced protection against adversarial attacks according to some embodiments. In some embodiments, the computing device 600 includes one or more processors 610 including one or more processors cores 618 and a TEE 664, the TEE including a machine learning service enclave (MLSE) 680. In some embodiments, the computing device 600 includes a hardware accelerator 668, the hardware accelerator including a cryptographic engine 682 and a machine learning model 684. In some embodiments, the computing device is to provide enhanced protections against ML adversarial attacks, as provided in FIGS. 1-5.

The computing device 600 may additionally include one or more of the following: cache 662, a graphical processing unit (GPU) 612 (which may be the hardware accelerator in some implementations), a wireless input/output (I/O) interface 620, a wired I/O interface 630, memory circuitry 640, power management circuitry 650, non-transitory storage device 660, and a network interface 670 for connection to a network 672. The following discussion provides a brief, general description of the components forming the illustrative computing device 600. Example, non-limiting computing devices 600 may include a desktop computing device, blade server device, workstation, or similar device or system.

In embodiments, the processor cores 618 are capable of executing machine-readable instruction sets 614, reading data and/or instruction sets 614 from one or more storage devices 660 and writing data to the one or more storage devices 660. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like.

The processor cores 618 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The computing device 600 includes a bus or similar communications link 616 that communicably couples and facilitates the exchange of information and/or data between various system components including the processor cores 618, the cache 662, the graphics processor circuitry 612, one or more wireless I/O interfaces 620, one or more wired I/O interfaces 630, one or more storage devices 660, and/or one or more network interfaces 670. The computing device 600 may be referred to in the singular herein, but this is not intended to limit the embodiments to a single computing device 600, since in certain embodiments, there may be more than one computing device 600 that incorporates, includes, or contains any number of communicably coupled, collocated, or remote networked circuits or devices.

The processor cores 618 may include any number, type, or combination of currently available or future developed devices capable of executing machine-readable instruction sets.

The processor cores 618 may include (or be coupled to) but are not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 6 are of conventional design. Consequently, such blocks need not be described in further detail herein, as they will be understood by those skilled in the relevant art. The bus 616 that interconnects at least some of the components of the computing device 600 may employ any currently available or future developed serial or parallel bus structures or architectures.

The system memory 640 may include read-only memory ("ROM") 642 and random access memory ("RAM") 646. A portion of the ROM 642 may be used to store or otherwise retain a basic input/output system ("BIOS") 644. The BIOS 644 provides basic functionality to the computing device 600, for example by causing the processor cores 618 to load and/or execute one or more machine-readable instruction sets 614. In embodiments, at least some of the one or more machine-readable instruction sets 614 cause at least a portion of the processor cores 618 to provide, create, produce, transition, and/or function as a dedicated, specific, and particular machine, for example a word processing machine, a digital image acquisition machine, a media playing machine, a gaming system, a communications device, a smartphone, or similar.

The computing device 600 may include at least one wireless input/output (I/O) interface 620. The at least one wireless I/O interface 620 may be communicably coupled to one or more physical output devices 622 (tactile devices, video displays, audio output devices, hardcopy output devices, etc.). The at least one wireless I/O interface 620 may communicably couple to one or more physical input devices 624 (pointing devices, touchscreens, keyboards, tactile devices, etc.). The at least one wireless I/O interface 620 may include any currently available or future developed wireless I/O interface. Example wireless I/O interfaces include, but are not limited to: BLUETOOTH®, near field communication (NFC), and similar.

The computing device 600 may include one or more wired input/output (I/O) interfaces 630. The at least one wired I/O interface 630 may be communicably coupled to one or more physical output devices 622 (tactile devices, video displays, audio output devices, hardcopy output devices, etc.). The at least one wired I/O interface 630 may be communicably coupled to one or more physical input devices 624 (pointing devices, touchscreens, keyboards, tactile devices, etc.). The wired I/O interface 630 may include any currently available or future developed I/O interface. Example wired I/O interfaces include, but are not limited to: universal serial bus (USB), IEEE 1394 ("FireWire"), and similar.

The computing device 600 may include one or more communicably coupled, non-transitory, data storage devices 660. The data storage devices 660 may include one or more hard disk drives (HDDs) and/or one or more solid-state storage devices (SSDs). The one or more data storage devices 660 may include any current or future developed storage appliances, network storage devices, and/or systems. Non-limiting examples of such data storage devices 660 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 660 may include one or more removable storage devices, such as one or more flash drives, flash memories, flash storage units, or similar appliances or devices capable of communicable coupling to and decoupling from the computing device 600.

The one or more data storage devices 660 may include interfaces or controllers (not shown) communicatively coupling the respective storage device or system to the bus 616. The one or more data storage devices 660 may store, retain, or otherwise contain machine-readable instruction sets, data structures, program modules, data stores, databases, logical structures, and/or other data useful to the processor cores 618 and/or graphics processor circuitry 612 and/or one or more applications executed on or by the processor cores 618 and/or graphics processor circuitry 612. In some instances, one or more data storage devices 660 may be communicably coupled to the processor cores 618, for example via the bus 616 or via one or more wired communications interfaces 630 (e.g., Universal Serial Bus or USB); one or more wireless communications interfaces 620 (e.g., Bluetooth®, Near Field Communication or NFC); and/or one or more network interfaces 670 (IEEE 802.3 or Ethernet, IEEE 802.11, or Wi-Fi®, etc.).

Processor-readable instruction sets 614 and other programs, applications, logic sets, and/or modules may be stored in whole or in part in the system memory 640. Such instruction sets 614 may be transferred, in whole or in part, from the one or more data storage devices 660. The instruction sets 614 may be loaded, stored, or otherwise retained in system memory 640, in whole or in part, during execution by the processor cores 618 and/or graphics processor circuitry 612.

The computing device 600 may include power management circuitry 650 that controls one or more operational aspects of the energy storage device 652. In embodiments, the energy storage device 652 may include one or more primary (i.e., non-rechargeable) or secondary (i.e., rechargeable) batteries or similar energy storage devices. In embodiments, the energy storage device 652 may include one or more supercapacitors or ultracapacitors. In embodiments, the power management circuitry 650 may alter, adjust, or control the flow of energy from an external power source 654 to the energy storage device 652 and/or to the computing device 600. The power source 654 may include, but is not limited to, a solar power system, a commercial electric grid, a portable generator, an external energy storage device, or any combination thereof.

For convenience, the processor cores 618, the graphics processor circuitry 612, the wireless I/O interface 620, the wired I/O interface 630, the storage device 660, and the network interface 670 are illustrated as communicatively coupled to each other via the bus 616, thereby providing connectivity between the above-described components. In alternative embodiments, the above-described components may be communicatively coupled in a different manner than illustrated in FIG. 6. For example, one or more of the above-described components may be directly coupled to other components, or may be coupled to each other, via one or more intermediary components (not shown). In another example, one or more of the above-described components may be integrated into the processor cores 618 and/or the graphics processor circuitry 612. In some embodiments, all or a portion of the bus 616 may be omitted and the components are coupled directly to each other using suitable wired or wireless connections.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

In various implementations, the computing device may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device may be any other electronic device that processes data or records data for processing elsewhere.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Some embodiments pertain to Example 1 that includes an apparatus to collect firmware measurement data at a computing system including a plurality of agents, each including a non-volatile memory storing firmware executed to perform a function associated with the agent, verification logic to generate measurement data by verifying the integrity of the firmware and a register to store the measurement data, and a processor to execute an instruction to collect firmware measurement data from each of the plurality of agents.

Example 2 includes the subject matter of Example 1, wherein the processor collecting the firmware measurement data comprises collecting first measurement data from a first register in a first agent and collecting second measurement data from a second register in a second agent.

Example 3 includes the subject matter of Examples 1 and 2, wherein the processor receives a manifest data structure from a software application.

Example 4 includes the subject matter of Examples 1-3, wherein the processor inserts the first and second measurement data in the manifest data structure.

Example 5 includes the subject matter of Examples 1-4, wherein the processor signs the manifest data structure with one or more cryptographic keys.

Example 6 includes the subject matter of Examples 1-5, wherein the processor transmits the manifest data to an agent external to the computing system.

Example 7 includes the subject matter of Examples 1-6, wherein the agent uses the manifest to receive firmware from one or more of the plurality of agents.

Example 8 includes the subject matter of Examples 1-7, wherein the processor retrieves the firmware from the one or more of the plurality of agents and transmits the firmware to the agent.

Example 9 includes the subject matter of Examples 1-8, further comprising an integrated on-chip system fabric coupled between the processor and each of the plurality of agents.

Some embodiments pertain to Example 10 that includes at least one computer readable medium having instructions stored thereon, which when executed by one or more processors, cause the processors to read a data manifest data structure, determine a number of agents within a computing system platform, collect firmware measurement data from each of the plurality of agents within the computing system platform and insert the firmware measurement data within the manifest data structure.

Example 11 includes the subject matter of Example 10, wherein the firmware measurement data is collected from a register within each of the plurality of agents.

Example 12 includes the subject matter of Examples 10 and 11, collecting first measurement data from a first set of one or more registers in a first agent and collecting second measurement data from a second set of one or more registers in a second agent.

Example 13 includes the subject matter of Examples 10-12, having instructions stored thereon, which when executed by one or more processors, cause the processors to sign the manifest data structure with one or more cryptographic keys.

Example 14 includes the subject matter of Examples 10-13, having instructions stored thereon, which when executed by one or more processors, cause the processors to receive a request to receive measurement data from the computing system platform.

Example 15 includes the subject matter of Examples 10-14, having instructions stored thereon, which when executed by one or more processors, cause the processors to transmit the manifest data to an agent external to the computing system.

Some embodiments pertain to Example 16 that includes a method to method to collect firmware measurement data from aa computing system reading a data manifest data structure, determining a number of agents within a computing system platform, collecting firmware measurement data from each of the plurality of agents within the computing system platform and inserting the firmware measurement data within the manifest data structure.

Example 17 includes the subject matter of Example 16, wherein the firmware measurement data is collected from a register within each of the plurality of agents.

Example 18 includes the subject matter of Examples 16 and 17, wherein collecting the firmware measurement data comprises collecting first measurement data from a first set of one or more registers in a first agent and collecting second measurement data from a second set of one or more registers in a second agent.

Example 19 includes the subject matter of Examples 16-18, further comprising signing the manifest data structure with one or more encryption keys.

Example 20 includes the subject matter of Examples 16-19, further comprising receiving a request to receive measurement data from the computing system platform.

Example 21 includes the subject matter of Examples 16-20, further comprising transmitting the signed manifest data to an agent external to the computing system.

The embodiments of the examples have been described above with reference to specific embodiments. Persons skilled in the art, however, will understand that various modifications and changes may be made thereto without departing from the broader spirit and scope as set forth in the appended claims. The foregoing description and drawings are, accordingly, to be regarded in an illustrative rather than a restrictive sense.

What is claimed is:

1. An apparatus comprising:
   a plurality of interconnect protocol (IP) agents, each including a register to store measurement data;
   a security controller to perform a hash operation on data at each of the IP agents to generate the measurement data; and
   one or more processors to access the register within each of the plurality of IP agents to collect firmware measurement data and write the collected firmware measurement data within a manifest data structure, wherein the measurement data is acquired by performing the hash operation on data at an IP agent.

2. The apparatus of claim 1, wherein collecting the firmware measurement data comprises collecting first measurement data from a first set of one or more registers in a first IP agent and collecting second measurement data from a second set of one or more registers in a second IP agent.

3. The apparatus of claim 2, wherein the one or more processors receive the manifest data structure from a software application.

4. The apparatus of claim 3, wherein the one or more processors insert the first and second measurement data in the manifest data structure.

5. The apparatus of claim 4, wherein the one or more processors sign the manifest data structure with one or more cryptographic keys.

6. The apparatus of claim 5, wherein the one or more processors transmits the manifest data structure to a cloud agent external to a computing system for verification.

7. The apparatus of claim 6, wherein the computing system uses the manifest data structure to receive firmware from one or more of the plurality of IP agents.

8. The apparatus of claim 1, further comprising an integrated on-chip system fabric coupled between the one or more processors and each of the plurality of IP agents.

9. At least one non-transitory computer readable medium having instructions stored thereon, which when executed by one or more processors, cause the processors to:
   access a register within each of a plurality of interconnect protocol (IP) agents within an integrated circuit to collect firmware measurement data; and
   write the collected firmware measurement data within a manifest data structure, wherein the measurement data is acquired by performing a hash operation on data at an IP agent.

10. The computer readable medium of claim 9, wherein collecting the firmware measurement data comprises:
    collecting first measurement data from a first set of one or more registers in a first IP agent; and
    collecting second measurement data from a second set of one or more registers in a second IP agent.

11. The computer readable medium of claim 10, having instructions stored thereon, which when executed by one or more processors, cause the processors to sign the manifest data structure with one or more cryptographic keys.

12. The computer readable medium of claim 11, having instructions stored thereon, which when executed by one or more processors, cause the processors to receive a request to receive measurement data.

13. The computer readable medium of claim 9, further comprising reading the data manifest data structure.

14. The computer readable medium of claim 9, wherein the manifest data structure is transmitted to a cloud agent.

15. A method comprising:
    accessing a register within each of a plurality of interconnect protocol (IP) agents within an integrated circuit to collect firmware measurement data; and
    writing the collected firmware measurement data within a manifest data structure, wherein the measurement data is acquired by performing a hash operation on data at an IP agent.

16. The method of claim 15, wherein collecting the firmware measurement data comprises:
    collecting first measurement data from a first set of one or more registers in a first IP agent; and
    collecting second measurement data from a second set of one or more registers in a second IP agent.

17. The method of claim 16, further comprising signing the manifest data structure with one or more encryption keys.

18. The method of claim 17, further comprising receiving a request to receive measurement data.

19. The method of claim 15, further comprising reading the data manifest data structure.

20. The method of claim 15, wherein the manifest data is transmitted to a cloud agent.

* * * * *